US009964731B2

(12) United States Patent
Osawa

(10) Patent No.: US 9,964,731 B2
(45) Date of Patent: May 8, 2018

(54) VIBRATION TYPE MOTOR, AND LENS DRIVE APPARATUS, LENS UNIT AND IMAGE PICKUP APPARATUS USING VIBRATION TYPE MOTOR

(71) Applicant: CANON KABUSHIKI KAISHA, Tokyo (JP)

(72) Inventor: Kazuharu Osawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 170 days.

(21) Appl. No.: 15/165,180

(22) Filed: May 26, 2016

(65) Prior Publication Data
US 2016/0349477 A1 Dec. 1, 2016

(30) Foreign Application Priority Data
May 29, 2015 (JP) ................. 2015-110460

(51) Int. Cl.
G02B 7/04 (2006.01)
H02N 2/00 (2006.01)
H02N 2/02 (2006.01)
G03B 3/10 (2006.01)
G03B 5/00 (2006.01)

(52) U.S. Cl.
CPC .......... G02B 7/04 (2013.01); G03B 3/10 (2013.01); G03B 5/00 (2013.01); H02N 2/0065 (2013.01); H02N 2/026 (2013.01); G03B 2205/0061 (2013.01)

(58) Field of Classification Search
CPC ..... G02B 7/04; G03B 5/00; G03B 3/10; G03B 2205/0061; H02N 2/026; H02N 2/0065
See application file for complete search history.

(56) References Cited

U.S. PATENT DOCUMENTS

2008/0145042 A1* 6/2008 Kawai ................ G03B 5/00
396/55

FOREIGN PATENT DOCUMENTS

JP 09-215348 A 8/1997
JP 2004-304887 A 10/2004

* cited by examiner

Primary Examiner — Joseph P Martinez
(74) Attorney, Agent, or Firm — Cowan, Liebowitz & Latman, P.C.

(57) ABSTRACT

A vibration type motor includes a vibrator, a friction member extending in a predetermined direction and including a first surface in pressed contact with the vibrator and a second surface positioned on a side opposed to the first surface and a holding member holding the friction member. The first surface forms with a surface adjacent thereto a first corner portion extending in a direction parallel with the predetermined direction, the second surface forms with a surface adjacent thereto a second corner portion, the first corner portion is different in radius of curvature from the second corner portion, either one of the first surface and the second surface is in contact with the holding member, either one of the first corner portion and the second corner portion has a radius of curvature smaller than the other.

17 Claims, 8 Drawing Sheets

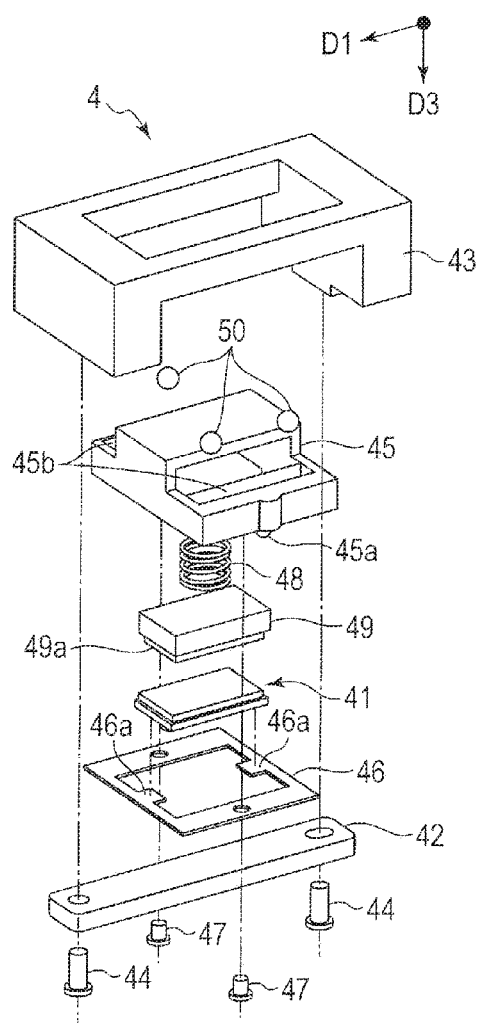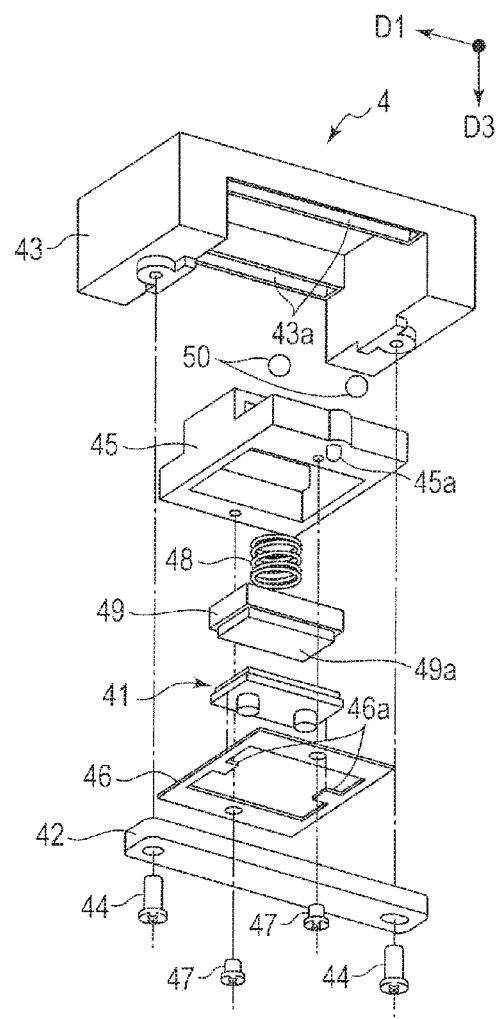

VIBRATION TYPE MOTOR, AND LENS DRIVE APPARATUS, LENS UNIT AND IMAGE PICKUP APPARATUS USING VIBRATION TYPE MOTOR

BACKGROUND OF THE INVENTION

Field of the Invention

The present invention relates to a vibration type motor using a vibrator that vibrates by application of an AC voltage, and a lens driving apparatus, a lens unit and an image pickup apparatus, using the vibration type motor.

Description of the Related Art

A vibration type motor using ultrasonic vibration of a piezoelectric element has characteristics of compactness, attainment of a high drive force, operativeness in a wide speed range, low vibration and low noise. Because of these characteristics, the vibration type motor is used for linear drive of a focus lens and for rotational drive of a cam cylinder in, for example, a lens barrel of a camera that needs compactness and high-output drive.

As a drive principle of the vibration type motor, there has been known that a vibrator vibrates using expansion and constriction of a piezoelectric element by piezoelectric effect and the vibration is transmitted to a friction member that is brought into pressed contact with the vibrator so as to relatively move the friction member. An apparatus disclosed in Japanese Patent Application Laid-Open No. 2004-304887 is an example of the vibration type motor.

The apparatus disclosed in Japanese Patent Application Laid-Open No. 2004-304887 is a vibration type motor in which a flat plate-shaped vibrator provided with a projection generates a plurality of vibration modes and causes the projection to generate elliptical movement by a combination of the vibrations modes. The projection is in pressed contact with the friction member, and when the projection is caused to generate the elliptical movement, the projection feeds out the fiction member while repeatedly contacting with and separating from the friction member. Accordingly, the friction member is driven relatively to the vibrator.

On this occasion, if a resonance frequency of the friction member overlaps with a drive frequency band for vibrating the vibrator, resonance of the friction member is induced to cause unnecessary vibration, thereby decreasing drive force and generating noise. To address the problems, Japanese Patent Application Laid-Open No. H9-215348 has proposed to design a structure in which a resonance frequency of the friction member is set within a predetermined range in such a manner that a drive frequency band of the vibrator and the resonance frequency of the friction member do not overlap with each other.

Even in the case where the resonance frequency of the friction member designed to be set within the predetermined range, due to slight variations in dimension of components and in fixing method, the resonance frequency of the friction member is changed. Accordingly, even in the case where the resonance frequency of the friction member is designed to be set within the predetermined range so as not to overlap with the drive frequency band, it has happened that the resonance frequency of the friction member has overlapped with the drive frequency band for vibrating the vibrator in manufactured products, thereby reducing drive force and generating noise.

Specifically, in a case where the friction member is manufactured by a manufacturing method that is inexpensive in costs such as press forming, it is difficult to form a corner portion of the friction member stably so that the resonance frequency cannot be set within the predetermined range and the driving force is decreased and noise occurs easily.

SUMMARY OF THE INVENTION

Therefore, an object of the invention is provide a vibration type motor and a lens drive apparatus using the vibration type motor in which changes in resonance frequency of the friction member due to variations in dimension of components and in fixing method are lowered and that hardly decreases drive force and generates noise.

To achieve the above-mentioned object, a vibration type motor of the invention includes:

a vibrator that vibrates by application of an AC voltage;

a friction member that includes a first surface in pressed contact with the vibrator and a second surface positioned on a side opposed to the first surface, the friction member extending in a predetermined direction; and a holding member that holds the friction member, wherein the surface forms with a surface adjacent thereto a first corner portion extending in a direction parallel with the predetermined direction, wherein the second surface forms with a surface adjacent thereto a second corner portion extending in the direction parallel with the predetermined direction, wherein the first corner portion is different in radius of curvature from the second corner portion, and wherein either one of the first surface and the second surface is in contact with the holding member, the either one of the first surface and the second surface forms with the surface adjacent thereto one of the first corner portion and the second corner portion and the one of the first corner portion and the second corner portion has a radius of curvature smaller than the other.

According to the invention, there can be provided a vibration type motor, and a lens drive apparatus, lens unit and an image pickup apparatus using the vibration type motor in which changes in resonance frequency of the friction member due to variations in dimension of components and in fixing method are lowered and that hardly decreases drive force and generates noise.

Further features of the present invention will become apparent from the following description of exemplary embodiments with reference to the attached drawings.

BRIEF DESCRIPTION OF THE DRAWINGS

FIGS. 8A and 8B are exploded perspective views illustrating the vibration type motor used for a lens drive apparatus according to the invention.

DESCRIPTION OF THE EMBODIMENTS

Figure 1A:
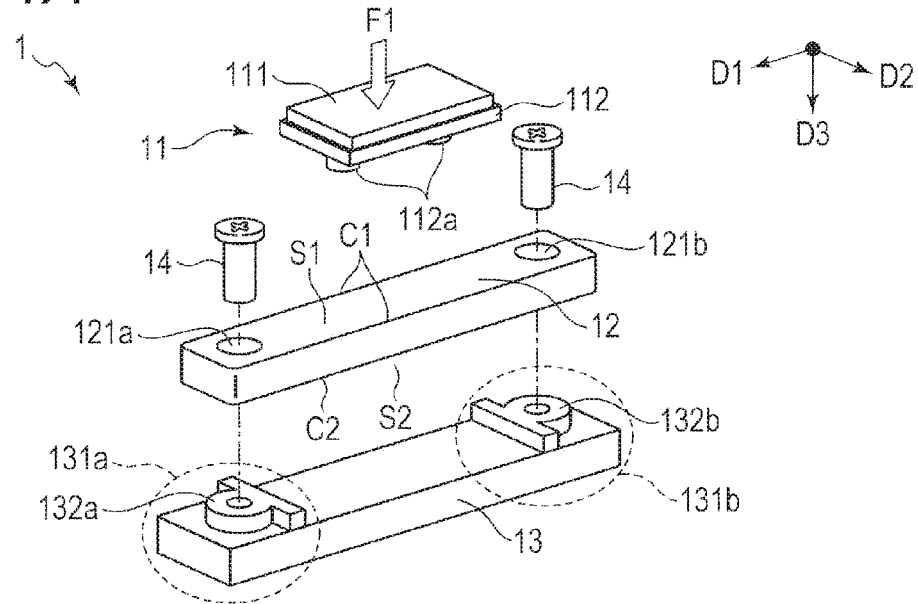
FIGS. 1A, 1B and 1C are views illustrating a vibration type motor according to a first embodiment of the invention.

Basic embodiments to which the present invention is applied will be specifically described with reference to the accompanying drawings. In the drawings, the same components are denoted by the same reference numerals. It is needless to say that the following embodiments will be exemplarily explained and the invention is not limited thereto.

First Embodiment

Figure 1B:
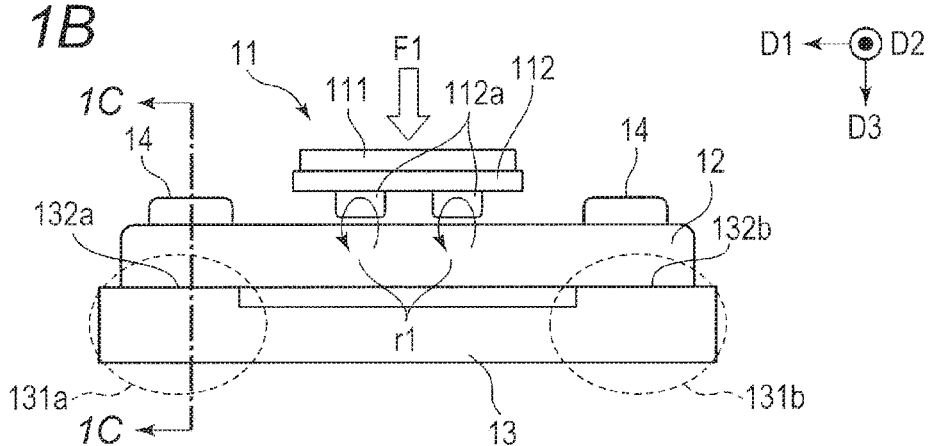
Figure 1C:
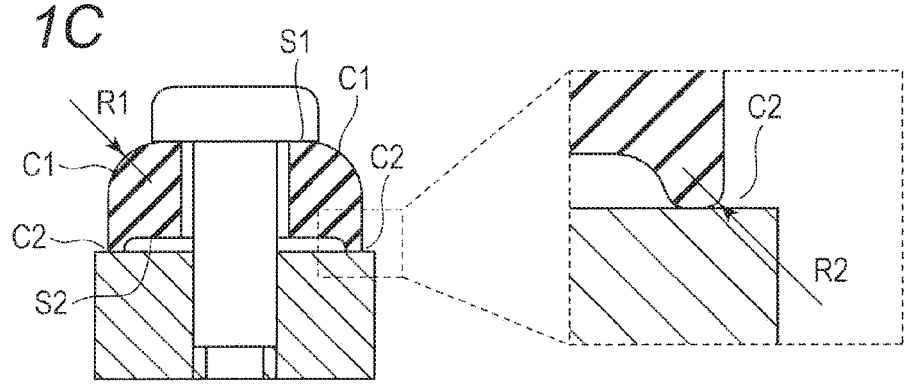

First, a configuration and characteristics of a vibration type motor 1 according to a first embodiment of the invention will be explained in detail. FIGS. 1A, 1B and 1C are views illustrating the vibration type motor 1 according to the first embodiment of the invention. FIG. 1A is an exploded perspective view illustrating the vibration type motor 1, FIG. 1B is a view illustrating the vibration type motor 1 viewed from a side surface direction (D2 direction in FIGS. 1A and 1B) of a drive direction (D1 direction in FIGS. 1A and 1B) and FIG. 1C is a cross sectional view taken along line 1C-1C of FIG. 1B.

As illustrated in FIGS. 1A and 1B, the vibration type motor 1 is constituted by a vibrator 11, the friction member 12, the holding member 13 and fastening members 14.

The vibrator 11 is constituted by a piezoelectric element 111 that expands and constricts by application of a voltage and an elastic member 112. A proper AC voltage is applied to the electrostatic element 111 to vibrate the vibrator 11. The elastic member 112 is provided with projections 112a projecting in a direction toward the friction member 12 to be described below, and when the vibrator 11 vibrates, the projections 112a generate elliptical movement illustrated by r1 of FIG. 1B. Since a method of applying an AC voltage and a principle for generating the elliptical movement of the projections are omitted since they are the same as those disclosed in Japanese Patent Application Laid-Open No. 2004-304887.

The vibrator 11 receives pressing force F1 by unillustrated pressing means and the projections 112a are in pressed contact with the friction member 12. The friction member 12 is a member having a right-angled parallelepiped shape extending in the D1 direction of FIGS. 1A and 1B. In a state where the projections 112a are in pressed contact with the friction member 12, when the projections 112a are caused to generate the elliptical movement, the projections 112a provide friction force to the friction member 12 repeatedly. By the friction force, the friction member 12 is relatively driven. On this occasion, when a position of the friction member 12 is fixed, the vibrator 11 moves in the D1 direction in FIGS. 1A and 1B. In contrast, when a position of the vibrator 11 is fixed, the friction member 12 moves in the D1 direction of FIGS. 1A and 1B. Further, the friction member 12 is provided with hole portions 121a and 121b for fixation.

A holding member 13 is a member that holds the friction member 12 and includes two fixing portions 131a and 131b. Further, contact surfaces 132a and 132b projecting toward the friction member 12 are formed at the fixing portions 131a and 131b to contact with the friction member 12.

The fastening members 14 fit in the fixing portions 131a and 131b of the holding member 13 through the hole portions 121a and 121b of the friction member 12. With this configuration, the friction member 12 can be fastened to the holding member 13. A screw or the like may be used for the fastening members 14.

Here, for example, metal having high hardness may be used for the friction member 12. Further, to form the friction member 12 into the right-angled parallelepiped shape extending in the D1 direction in FIGS. 1A and 1B, for example, press processing used. In this way, the friction member 12 can be manufactured at low costs. Here, a sag or a burr is generated depending on a processing direction and corner portions of the friction member 12 having the right-angled parallelepiped shape have different radii of curvature. Here, as to the friction member 12, a surface with which the projections 112a of the vibrator 11 are in contact is defined as a first surface S1 and a surface positioned opposed to the first surface S1 is defined as a second surface S2. Further, a corner portion that is formed between the first surface S1 and a surface adjacent to the first surface S1 and that extends in a direction parallel to a predetermined direction (D1 direction of FIGS. 1A and 1B) in which the friction member extends is defined as a first corner portion C1. Furthermore, a corner portion that extends in a direction parallel to a predetermined direction (D1 direction of FIGS. 1A and 1B) in which the friction member 12 extends and that is formed between the second surface S2 and a surface adjacent to the second surface S2 is defined as a second corner portion C2.

FIG. 1C is a cross sectional view taken along line 1C-1C of FIG. 1B and illustrating the first corner portion C1 and the second corner portion C2 in detail.

When a radius of curvature of the first corner portion C1 is defined as R1 and a radius of curvature of the second corner portion C2 defined as R2, R2 is smaller than R1. A characteristic of the vibration type motor 1 is that the radius of curvature R1 of the first corner portion C1 is different in dimension from the radius of the curvature R2 of the second corner portion C2. Further, another characteristic thereof is that the second surface S2 forming the second corner portion C2 having a smaller radius of curvature of the first corner portion C1 and the second corner portion C2 is in contact with the contact surfaces 132a and 132b of the holding member 13. Operations and effects of these characteristics will be described.

Subsequently, the operations of the vibration type motor 1 according to the first embodiment of the invention will be described.

Figure 2A:
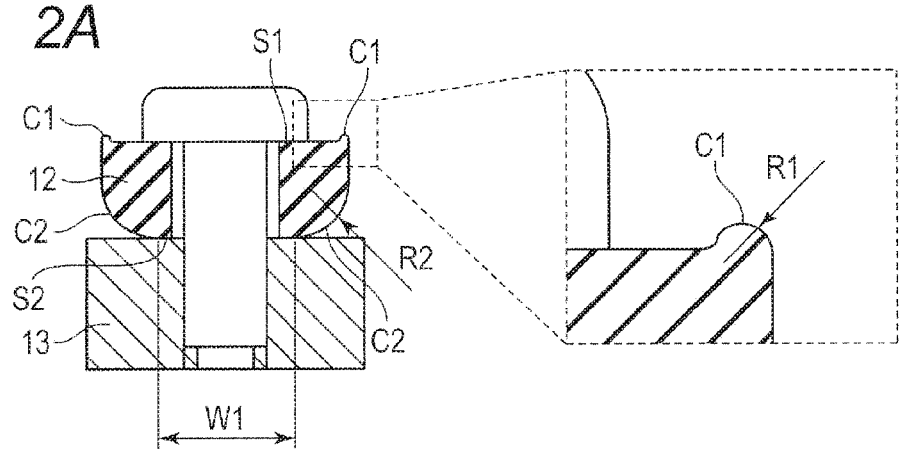
FIGS. 2A, 2B and 2C are views illustrating a fixed state of a friction member.
Figure 2B:
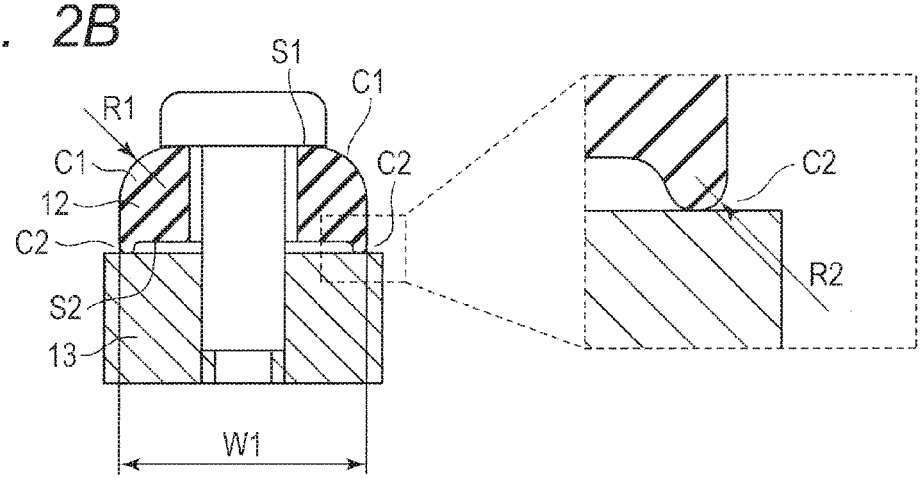
Figure 2C:
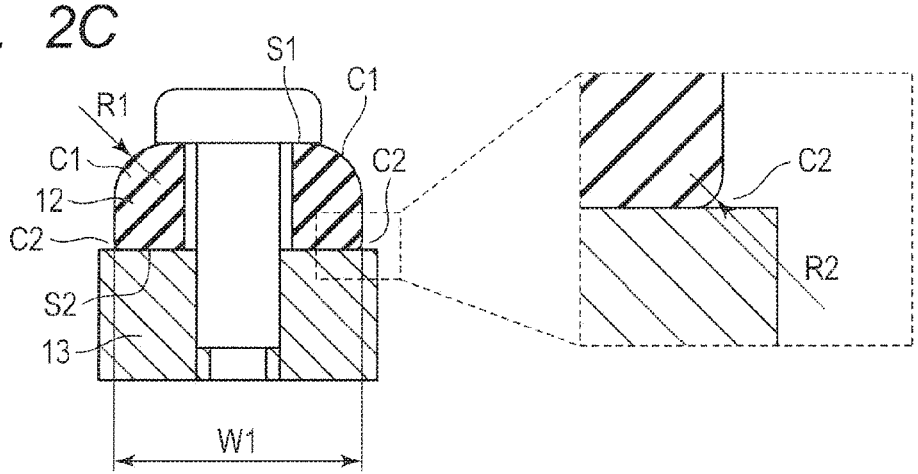

FIGS. 2A, 2B and 2C are cross sectional views each similar to FIG. 1C. FIG. 2A is a view explaining a case not provided with the above mentioned characteristics of the vibration type motor 1 and FIGS. 2B and 2C are views explaining a case provided with the above mentioned characteristics of the vibration type motor 1. FIG. 2A is a view illustrating a state where the friction member 12 has sags and burrs generated by, for example, press processing is fixed in such a manner that sagged surfaces are in contact with the holding member 13. FIG. 2B is a view illustrating a state where the friction member 12 has sags and burrs generated by, for example, press processing is fixed in such a manner that a burr surface is in contact with the holding member 13. FIG. 2C is a view illustrating a state where the friction member 12 to which a process such as a burr taking out process for taking out burrs has been performed after, for example, the press processing is fixed in such a manner that surfaces on a side opposed to the sagged surfaces are in contact with the holding member 13.

In FIG. 2A, the radius of curvature R1 of the first corner portion C1 is smaller than the radius of curvature R2 of the second corner portion C2. However, not the first surface S1 forming the first corner portion C1 having the smaller radius of curvature of the first corner portion C1 and the second corner portion C2, but the second surface S2 is in contact with the holding member 13.

Like an apparatus disclosed in Japanese Patent Application Laid-Open No. H9-215348, the friction member 12 is designed to have a resonance frequency within the predetermined range and not to overlap with a drive frequency at which the vibrator 11 vibrates. However, due to variations in dimension of components and in fixing method, there is possible that the resonance frequency is changed from a designed value. In a case where the second surface S2 in contact with the holding member 13 as illustrated in FIG. 2A, has the second corner portion C2 having a larger radius of curvature, a width W1 of contact range between the friction member 12 and the holding member 13 becomes small. Further, it is difficult to control the radius of curvature R2 strictly and the width W1 of the contact range is easily varied. A result of analyzation of changes in resonance frequency of the friction member 12 by using finite element method (FEM) is illustrated in FIGS. 5A and 5B when the width W1 of the contact range between the friction member 12 and the holding member 13 is changed.

Figure 5A:
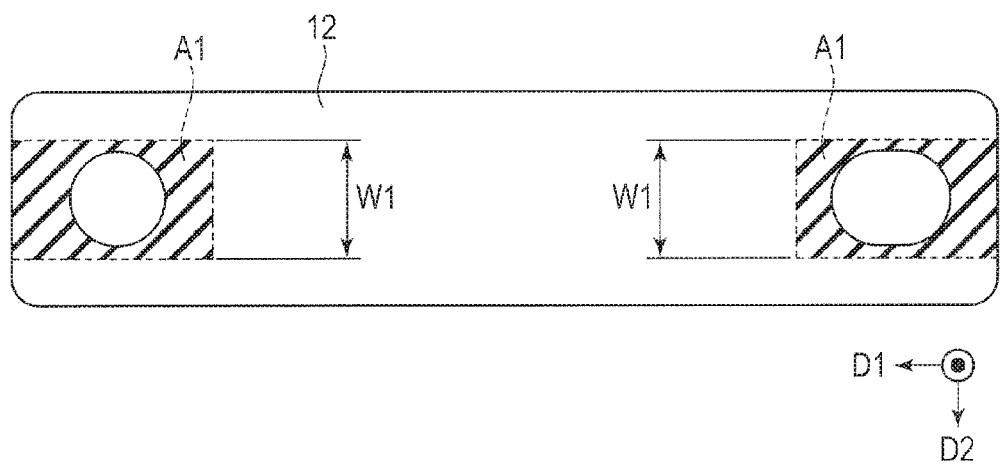
FIGS. 5A and 5B are views explaining a problem of a conventional vibration type motor.
Figure 5B:
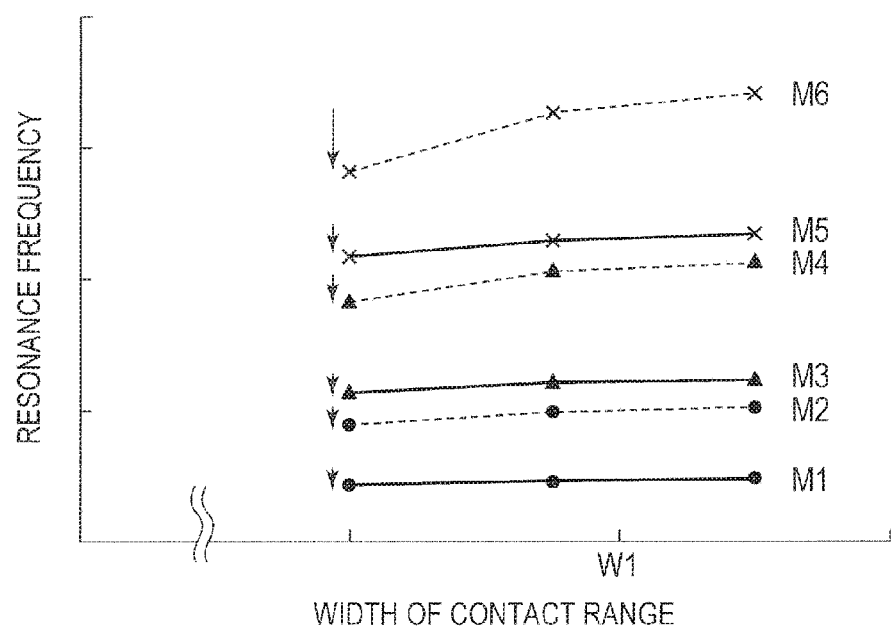

FIG. 5A is a view illustrating conditions for the FEM analysis of the friction member 12. Shaded portions A1 indicate contact ranges between the friction member 12 and the contact surfaces 132a and 132b of the holding member 13 in FIG. 5A. Further, FIG. 5B illustrates changes in resonance frequency in vibration modes when widths of contact areas between the friction member 12 and the holding member 13 are made small. Solid lines denoted by M1, M3 and M5 in FIG. 5B indicate changes in resonance frequency of a flexural primary vibration mode, a flexural secondary vibration mode and a flexural thirdly vibration mode of the friction member 12, respectively. Further, broken lines denoted by M2, M4 and M6 in FIG. 5B indicate changes in resonance frequency of a torsional primary vibration mode, a torsional secondary vibration mode and a torsional thirdly vibration mode, respectively. As illustrated in FIG. 5B, in any of vibration modes denoted by M1 to M6, there is tendency that resonance frequency is lowered as the widths W1 of the contact ranges become small. According to the above FEM analysis results, it is appreciated that in a case where the width W1 of the contact range is easily varied as illustrated in FIG. 2A, the resonance frequency of the friction member 12 is easily varied significantly.

In FIGS. 2B and 2C, unlike in FIG. 2A, the radius of curvature R1 of the first corner portion C1 is larger than the radius of curvature R2 of the second corner portion C2. And the second surface S2 forming the second corner portion C2 having a smaller radius of curvature of the first corner portion C1 and the second corner portion C2 is in contact with the holding member 13. Although in FIG. 2B, contact areas are small since only convex portions formed by burrs are in contact with the holding member 13, the width W1 of the contact range can be made wider than that in FIG. 2A. Further, in FIG. 2C, a substantially entire area becomes the contact range so that the width W1 of the contact range can be made wider than that of FIG. 2A. Furthermore, the radius of curvature R1 of the second corner portion C2 is small so that variations of the radius of curvature R2 hardly affect the width W1 of the contact range. According to the FEM analysis results illustrated in FIG. 5B, it is appreciated that in a case where the width W1 of the contact range as illustrated in FIGS. 2B and 2C hardly varies, the resonance frequency of the friction member 12 hardly changes.

Effects obtained from the vibration type motor 1 according to the first embodiment of the invention will be explained below.

Figure 6A:
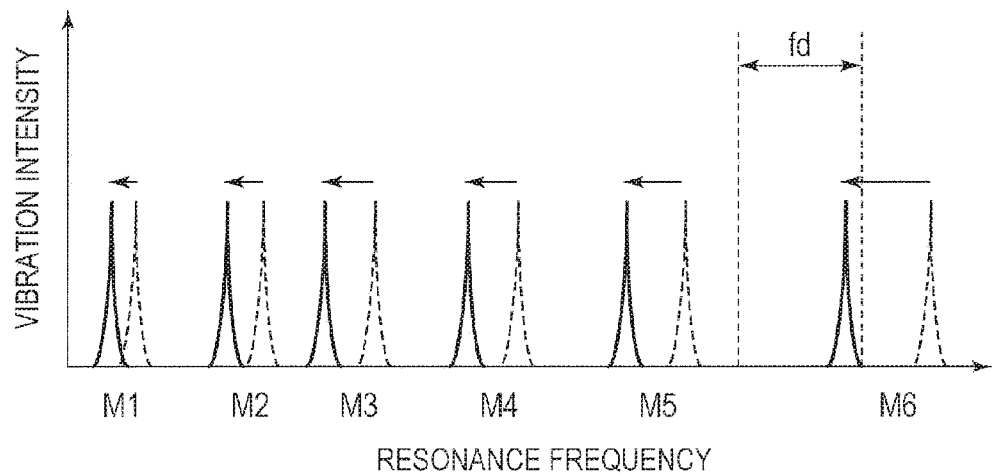
FIGS. 6A and 6B are views illustrating the distribution of resonance frequencies of the friction member and explaining effects obtained by the vibration type motor of the invention.
Figure 6B:
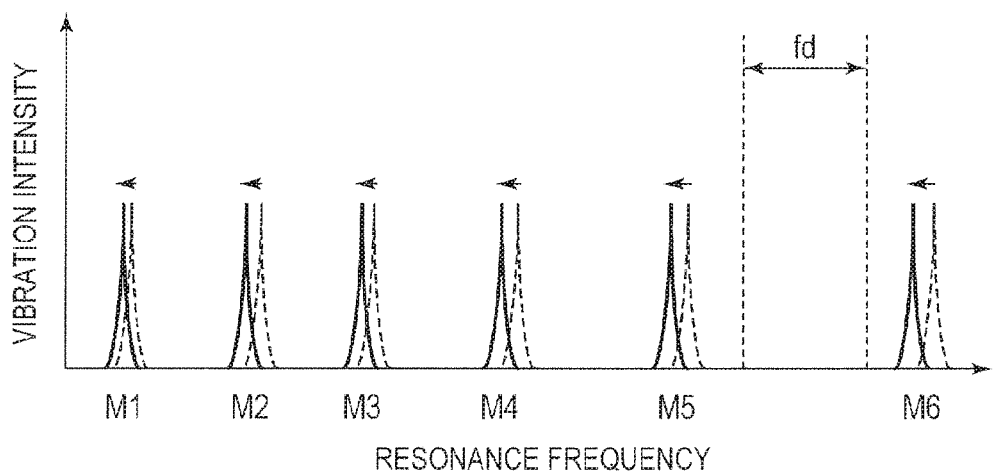

FIGS. 6A and 6B are views illustrating the distribution of the resonance frequencies of the friction member 12. FIGS. 6A and 6B illustrate the distribution of resonance frequencies in the vibration modes M1 to M6 illustrated in FIG. 5B. FIG. 6A illustrates the distribution of resonance frequencies of the friction member 12 in a case where the width W1 of the contact range is changed significantly and the resonance frequency is changed significantly as illustrated in FIG. 2A. Further, FIG. 6B illustrates the distribution of resonance frequencies of the friction member 12 in a case where variations in the width W1 of the contact range is small and changes in the resonance frequency are small as illustrated in FIGS. 2B and 2C. Set values of the resonance frequency of the friction member 12 are illustrated by broken lines and values after the resonance frequency is changed due to the variations in the width W1 of the contact range are illustrated by solid lines. Furthermore, a drive frequency band for vibrating the vibrator 11 is denoted by fd.

Like the apparatus disclosed in Japanese Patent Application No. H9-215348, the resonance frequency of the friction member 12 is set not to overlap with the drive frequency band fd of the vibrator 11. As illustrated in FIG. 6A, in the case where the changes in the resonance frequency of the friction member 12 are large, the drive frequency band fd and the resonance frequency of the friction member 12 can overlap with each other. Because of this, resonance of the friction member 12 is induced to generate unwanted vibration so that drive force can be decreased or noise can occur. In contrast, in a case where lowering of resonance frequency of the friction member 12 is small as illustrated in FIG. 6B, the drive frequency band fd of the vibrator 11 and the resonance frequency of the friction member 12 do not overlap with each other, thereby preventing the drive force from being decreased and noise from being generated.

As described above, the first corner portion C1 and the second corner portion C2 are different in radius of curvature from each other, and either one of the first surface S1 and the second surface S2 is in contact with the holding member 13, the either one of the first surface S1 and the second surface S2 forms one of the first corner portion C1 and the second corner portion C2 and the one of the first corner portion C1 and the second corner portion C2 has a radius of curvature of a corner smaller than the other thereof. Therefore, there can be provided the vibration type motor 1 in which changes in resonance frequency of the friction member 12 due to variations in dimension of components and in fixing method are lowered and that hardly decreases drive force and generates noise.

It is noted that, in the vibration type motor 1 according to the first embodiment, the radius of curvature R2 of the second corner portion C2 formed by the second surface S2 is smaller than the radius of curvature R1 of the first corner portion C1 formed by the first surface S1. Here, it is exemplified that the second surface S2 forming the corner portion having the small radius of curvature is in contact with the holding member 13. However, the invention is not limited to the above, and if either one of the first surface S1 and the second surface S2 forming one of the first corner portion C1 and the second corner portion C2 is in contact with the holding member 13 and the one of the first corner portion C1 and the second corner portion C2 has a radius of curvature smaller than the other thereof, the effects of the invention can be achieved. For example, when the radius curvature R1 of the first corner portion C1 is smaller than the radius of curvature R2 of the second corner portion, the first surface S1 needs to be in contact with the holding member 13.

It is noted that in the vibration type motor 1 according to the first embodiment, it is exemplified that the friction member 12 is formed by press processing to have the radius of curvature R1 of the first corner portion C1 and the radius of curvature R2 of the second corner portion C2 different in shape from each other. However, the forming method of the friction member 12 according to the invention is not limited to the press processing, and if the radius of curvature R1 of the first corner portion C1 and the radius of curvature R2 of the second corner portion C2 are different from each other, the effects of the invention can be obtained. Accordingly, there can be provided the vibration motor 1 in which changes in resonance of the friction member 12 due to variations in dimension of components and in fixing method are reduced and that hardly decreases drive force and generates noise.

Figure 4A:
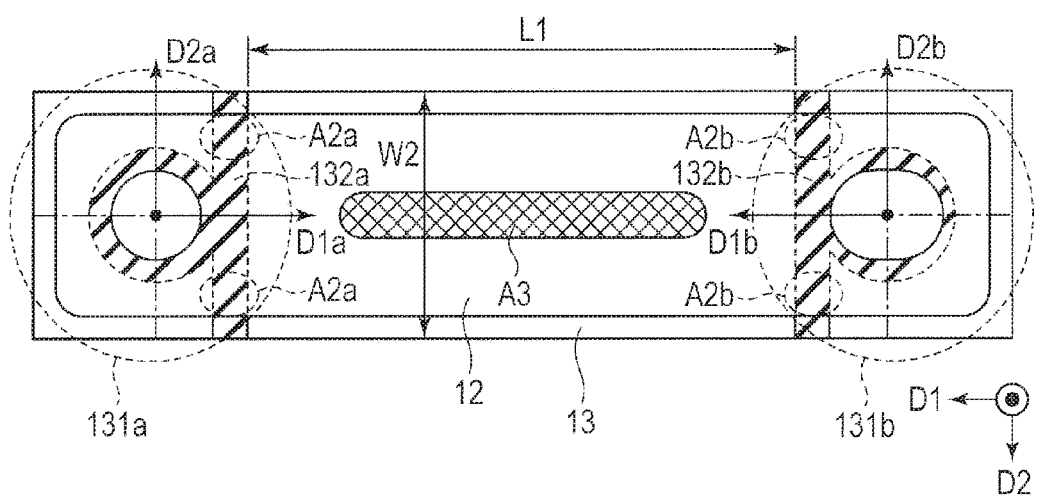
FIGS. 4A and 4B are views illustrating a fiction member and a holding member viewed from a direction perpendicular to contact surfaces of the holding member.
Figure 4B:
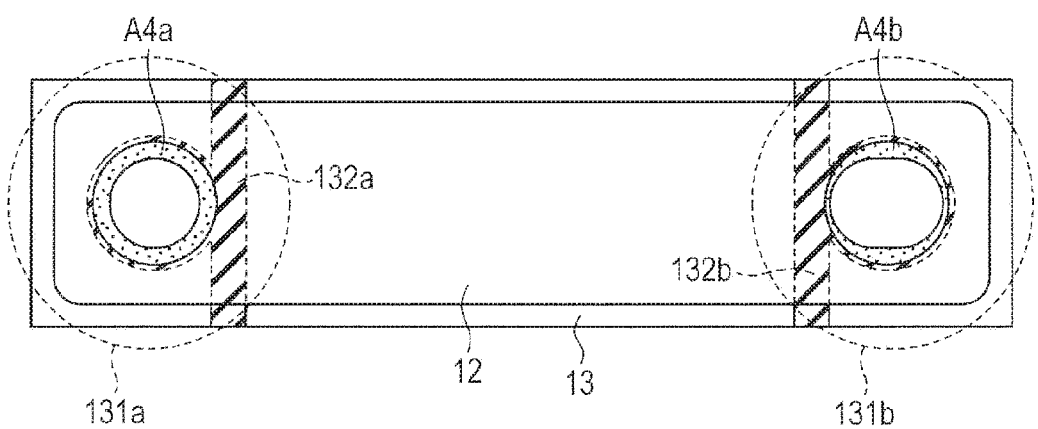

Here, shapes of the contact surfaces 132a and 132b of the holding member 13 and shapes of surfaces of the fastening members 14 in contact with the friction member 12 will be explained using FIGS. 4A and 4B. FIGS. 4A and 4B are views illustrating the fiction member 12 and the hold a member 13 viewed from directions perpendicular to the contact surfaces 132a and 132b of the holding member 13. In the friction member 12, an area where the projection 112a of the vibrator 11 frictionally slides is defined as a slide area A3. Further, directions in which the friction member 12 extends viewed from the fastening portions 131a and 131b are defined as first directions D1a and D1b, respectively. Furthermore, in the fastening portions 131a and 131b, directions perpendicular to the first directions D1a and D1b on the contact surfaces 132a and 132b are defined as second directions D2a and D2b, respectively. In the vibration type motor 1, each of lengths of the contact surfaces 132a and 132b of the fastening portions 131a and 131b in the second directions D2a and D2b is maximized at corresponding end portions on sides where the slide area A3 is present in the first directions D1a and D1b, as denoted by W2 in FIG. 4A. Namely, at least a portion of the contact surface 132a and at least a portion of the contact surface 132b extend beyond end portions the first surface S1 (contact surface) of the friction member 12 in a direction parallel to the first surface S1.

In the vibration motor 1 of the invention, the width W1 of the contact range between the friction member 12 and the holding member 13 is large and hardly varies as illustrated in FIGS. 2B and 2C. And, it has an operation by which the friction member 12 and the holding member 13 are securely in contact with each other at the end portions in the width direction of the friction member 12. Here, as illustrated in FIG. 4A, lengths of the contact surfaces 132a and 132b in the second directions D2a and D2b are maximized at end portions on sides where the slide area A3 in the first directions D1a and D1b is present as illustrated by W2 in FIG. 4A. On the occasion, as illustrated in FIG. 4A, the friction member 12 and the contact surfaces 132a and 132b are securely in contact with each other in areas A2a and A2b located at the both end portions in the width direction of the friction member 12.

Further, the areas A2a and A2b are disposed at the end portions on the sides where a slide area A3 is present in the first directions D1a and D1b viewed from the fixing portions 131a and 131b, respectively. Here, a length of an area of the friction member 12 where the vibrator 12 is freely movable without being fixed is defined as L1, which corresponds to a space between the areas A2a and A2b. The areas A2a and A2b are areas where the friction member 12 and the holding member 13 are securely in contact with each other without being affected by the corner portion of the friction member 12 so that L1 hardly varies.

Although the resonance frequency of the friction member 12 also depends on the length L1 of the area that is freely capable of vibrating, the length L1 hardly varies in the vibration motor 1. Accordingly, variations in resonance frequency of the friction member 12 due to variations in dimension of components and in fixing method is further reduced so that drive force hardly decreases and noise is hardly generated. As described above, lengths in the second directions D2a and D2b of the contact surfaces 132a and 132b with which the fixing portions 131a and 131b are provided are preferably maximized at the end portions on the sides where the slide area A3 is present in the first directions D1a and D1b, respectively.

Additionally, a relation between shapes of the contact surfaces 132a and 132b of the holding member 13 and areas where the fastening members 14 and the friction member 12 are in pressed contact with each other will be explained using FIG. 4B. FIG. 4B is a view in which the areas A4a and A4b where the fastening members 14 and the friction member 12 are in pressed contact with each other are projected on FIG. 4A. The areas A4a and A4b are included in the contact surfaces 132a and 132b in the vibration type motor 1.

When the areas A4a and A4b in which the fastening members 14 and the friction member 12 are in pressed contact with each other are not included in the contact surfaces 132a and 132b (for example, in a case where the fastening members 14 are inclinedly fastened), the friction member 12 is inclined corresponding to the areas A4a and A4b so that contact between the friction member 12 and the contact surfaces 132a and 132b may become instable. As a result, it is anticipated that the effects of the invention are reduced. Like the vibration type motor 1, the areas A4a and A4b where the fastening members 14 and the friction member 12 are in pressed contact with each other are included in the contact surfaces 132a and 132b. When they are included as above, even in a case where the fastening members 14 are inclinedly fastened, the friction member 12 follows the contact surfaces 132a and 132b so that the contact between the friction member 12 and the contact surfaces 132a and 132b can be made stably and the effects of the invention can be obtained sufficiently. As explained above, the areas A4a and A4b where the fastening members 14 and the friction member 12 are in pressed contact with each other are preferably included in the contact surfaces 132a and 132b viewed from the directions perpendicular to the contact surfaces 132a and 132b.

Second Embodiment

Next, a configuration and characteristics of a vibration type motor 2 according to a second embodiment of the invention will be explained in detail.

Figure 3A:
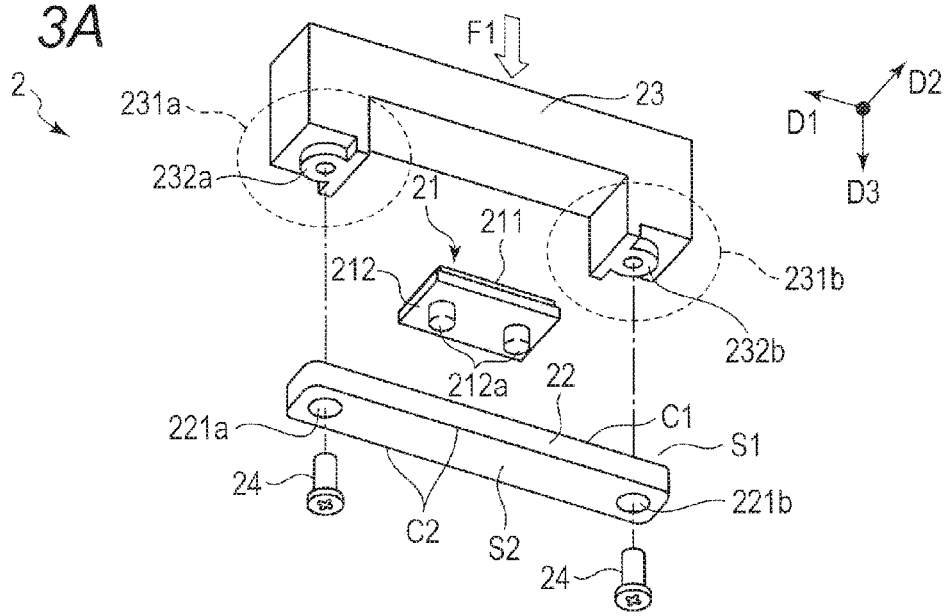
FIGS. 3A, 3B and 3C are views illustrating a vibration type motor according to a second embodiment of the invention.
Figure 3B:
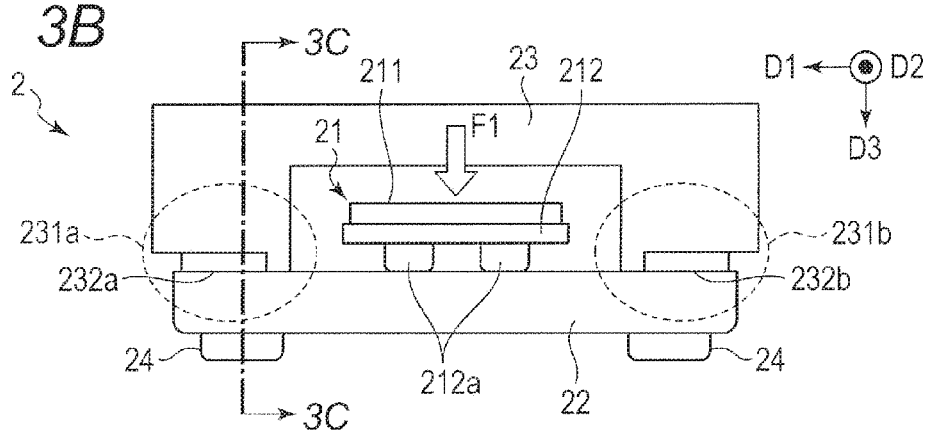
Figure 3C:
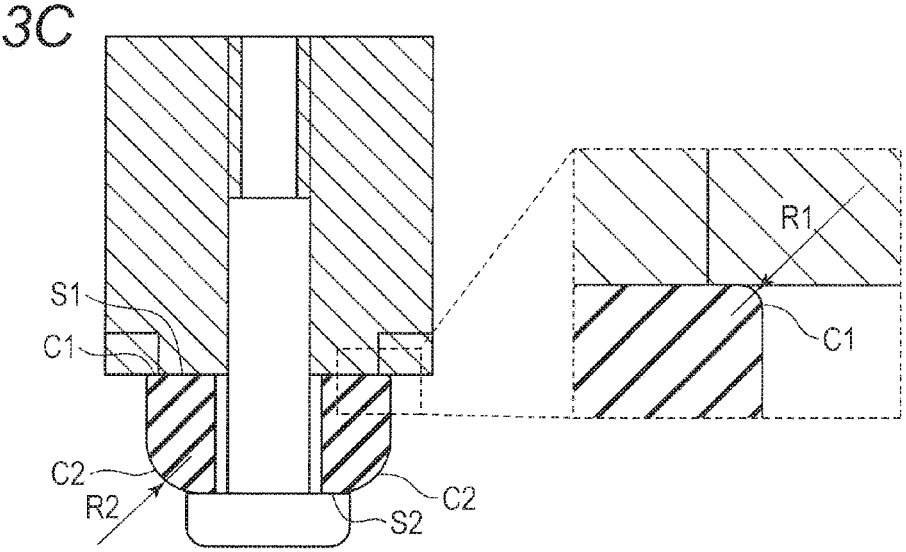

FIGS. 3A, 3B and 3C are views illustrating the vibration type motor 2 according to the second embodiment of the invention. FIG. 3A is an exploded perspective view illustrating the vibration type motor 2, FIG. 3B is a view illustrating the vibration type motor 2 viewed from a side surface direction (D2 direction in FIGS. 3A and 3B) of a drive direction (D1 direction in FIGS. 3A and 3B) and FIG. 3C is a cross sectional view taken along line 3C-3C of FIG. 3B.

As illustrated in FIGS. 3A and 3B, the vibration type motor 2 constituted by a vibrator 21, a friction member 22, a holding member 23 and fastening members 24.

The vibrator 21 is, similarly to the first embodiment, constituted by a piezoelectric element 211 and an elastic member 212, and the projections 212a projecting toward the friction member 22 to be described below formed at the elastic member 212. A principle of vibration of the vibrator 21 is similar to that of the first embodiment so that explanation thereof is omitted. The vibrator 21 is brought into pressed contact with the friction member 22 by pressing force F1. The friction member 22 is provided with hole portions 221a and 221b. The holding member 23 includes fixing portions 231a and 231b, and contact surfaces 232a and 232b are formed at the fixing portions 231a and 231b, respectively. Screws serving as fastening members 24 fasten the friction member 22 to the fixing portions 231a and 231b. These configurations are similar to those of the first embodiment. It is noted that a position of the vibrator 21 may be fixed or a position of the friction member 22 may be fixed in the embodiment, too.

Here, similarly to the first embodiment, a surface with which projections 212a of the vibrator 21 are in pressed contact is denoted by a first surface S1 and a surface positioned on a side opposed to the first surface S1 is denoted by a second surface S2. Further, a corner portion that is formed between the first surface S1 and a surface adjacent to the first surface S1 and extends in a direction (D1 direction in FIGS. 3A and 3B) in which the friction member 22 extends is denoted by a first corner portion C1. Furthermore, a corner portion that is formed between the second surface S2 and a surface adjacent to the second surface S2 and extends in the direction in which the friction member 22 extends is denoted by a second corner portion C2.

FIG. 3C is a cross sectional view taken along line 3C-3C of FIG. 3B and illustrating the first corner C1 and the second corner C2. When a radius of curvature of the first corner portion C1 is defined as R1 and a radius of curvature of the second corner portion C2 is defined as R2, R1 is smaller than R2. The characteristics of the vibration type motor 2 are that the radius of curvature R1 of the first corner portion C1 and the radius of curvature R2 of the second corner portion C2 are different in dimension and further the first surface S1 forming the first corner portion C1 having a smaller radius of curvature of the first corner portion C1 and the second corner portion C2 is in contact with fixing portions 231a and 231b of the holding member 23. Further, in the vibration motor 2 according to the second embodiment, unlike the first embodiment, the first surface S1 with which the contact surfaces 232a and 232b of the holding member 23 are in contact is in pressed contact with the projections 212a of the vibrator 21.

Subsequently, operations of the vibration type motor 2 according to the second embodiment of the invention will be explained.

In the vibration motor 2, the first surface S1 forming the first corner portion C1 having the smaller radius of curvature of the first corner portion C1 and the second corner portion C2 is in contact with the fixing portions 231a and 231b of the holding member 23. Accordingly, as explained in the first embodiment, a width of a contact range between the friction member 22 and the holding member 23 becomes large so that the width hardly varies. With this configuration, changes in resonance frequency of the friction member 22 become small. Further, the first surface S1 that serves a surface of the friction member 22 with which the projections 212a of the vibrator 21 is in contact is formed by a surface that is satisfactory in flatness and surface roughness such that the vibrator 21 can smoothly slide. Accordingly, the first surface S1 serving the surface that is satisfactory in flatness and surface roughness is in contact with the contact surfaces 232a and 232b of the holding member 23 so that the contact between the friction member 22 and the holding member 23 is easily stabilized. With this configuration, the fixing condition of the friction member 22 is easily stabilized so that changes in resonance frequency of the friction member 22 can be further reduced.

Subsequently, effects of the vibration type motor 2 according to the second embodiment of the invention will be described.

Similarly to the first embodiment, the width of the contact range between the friction member 22 and the holding member 23 becomes large and hardly varies, and changes in resonance frequency of the friction member 22 is small. As above, there can be provided the vibration motor 2 in which changes in resonance of the friction member 22 due to variations in dimension of components and in fixing method are reduced and that hardly decreases drive force and generates noise. Furthermore, a lens drive apparatus 3 using the vibration type motor 2 can be provided. Additionally, in the vibration type motor 2, the first surface S1 that is in contact with the contact surfaces 232a and 232b of the holding member 23 slides on the projections 212a of the vibrator 21. As a result of that, changes in resonance frequency of the friction member 22 are further reduced. Thus, here can be provided the vibration motor 2 in which changes in resonance of the friction member 22 due to variations in dimension of components and in fixing method are reduced and that hardly decreases drive force and generates noise.

It is noted that, similarly to the first embodiment, if either one of the first surface S1 and the second surface S2 forming one of the first corner portion C1 and the second corner portion C2 is in contact with the holding member 23 and the one of the first corner portion C1 and the second corner portion C2 has a radius of curvature smaller than the other thereof, the effects of the invention can be obtained.

Further, if the radius of curvature R1 of the first corner portion C1 and the radius of curvature R2 of the second corner portion C2 are different from each other, the effects of the invention can be obtained. Accordingly similarly to the first embodiment, the forming method of the friction member 22 according to the second embodiment of the invention is not limited to the press processing.

It is noted that if a slide area, a direction D1 and a direction D2 are defined similarly to the first embodiment, each of lengths in the direction D2 of the contact surfaces 232a and 232b which the fixing portions 231a and 231b include are preferably, similarly to the first embodiment, maximized at corresponding end portions on sides where the slide area in the direction D1 is present.

It is noted, similarly to the first embodiment, that the areas where the fastening members 24 and the friction member 22 are in pressed contact with each other are included in the contact surfaces 232a and 232b viewed from directions perpendicular to the contact surfaces 232a and 232b.

Third Embodiment

Next, a configuration and characteristics of a lens drive apparatus using a vibration type motor 4 according to a third embodiment of the invention will be explained in detail.

Figure 7A:
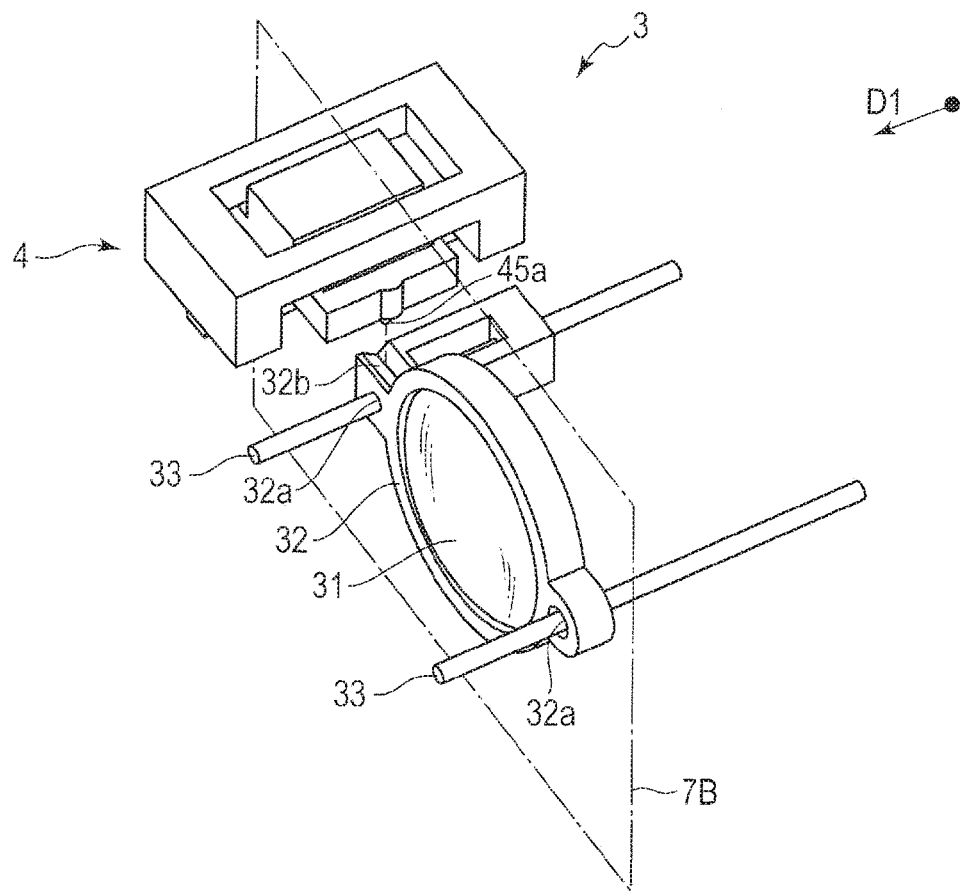
FIGS. 7A and 7B are views illustrating an entire lens drive apparatus using a vibration type motor according a third embodiment of the invention.
Figure 7B:
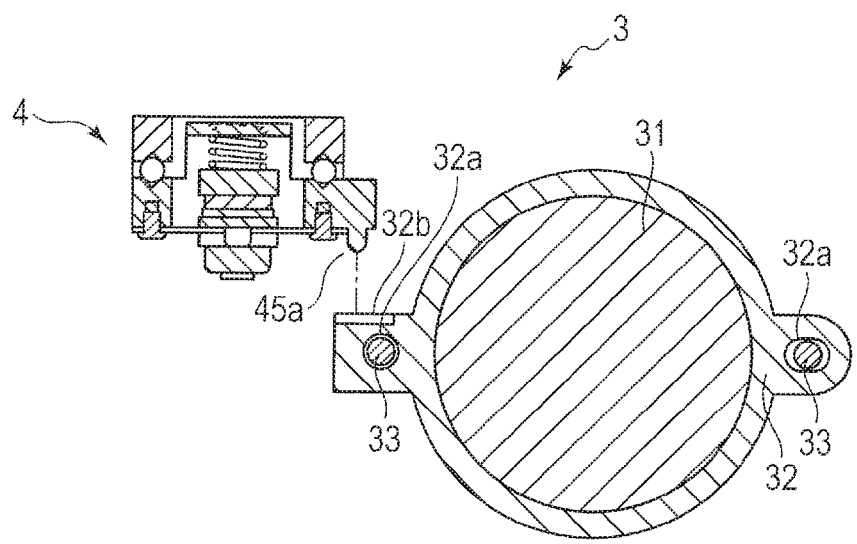

FIGS. 7A and 7B are views illustrating an entire lens drive apparatus 3 using the vibration type motor 4 according to the third embodiment. FIG. 7A is a perspective view illustrating the lens drive apparatus 3 and FIG. 7B is a cross sectional view illustrating the lens drive apparatus 3 taken along a plane 7B of FIG. 7A. The lens drive apparatus 3 is constituted by a lens 31, a lens holder 32, two guide bars 33 and the vibration type motor 4.

The lens 31 is a focus lens to be used for, for example, a camera barrel, and advances and retreats in an optical axis direction (D1 direction in FIG. 7A) of the lens to be capable of changing a focal length of light flux incident from the D1 direction in FIG. 7A.

The lens holder 32 holds the lens 31 and includes hold portions 32a which the guide bars 33 penetrate and a groove portion 32b connected with a drive force transmitting portion 45a formed at the vibration type motor 4.

The two guide bars 33 extend in the optical direction (D1 direction in FIG. 7A) of the lens 31 and penetrate the hold portions 32a of the lens holder 32 so that the lens holder 32 is guided to be movable in only the optical axis direction.

The vibration type motor 4 is a vibration type motor having characteristics similar to those of the vibration type motor 2 described in the second embodiment. The vibration type motor 4 includes the drive force transmitting portion 45a having a convex shape to transmit drive force of a motor, and the drive force transmitting portion 45a and the groove portion 32b fit in and are connected together. When the vibration type motor 4 is driven, the drive force is transmitted to the lens holder 32 by the connection between the drive force transmitting portion 45a and the groove portion 32b to enable the lens holder 32 and the lens 31 to move in the optical axis direction (D1 direction in FIG. 7A). It is noted that a mechanism for transmitting the drive force of the vibration type motor 4 to the lens holder 32 and a mechanism for moving the lens holder 32 and the lens 31 in the optical direction are not limited to the mechanism illustrated in FIGS. 7A and 7B and other mechanisms may be used.

FIGS. 8A and 8B are exploded perspective views illustrating the vibration type motor 4 used in the lens drive apparatus 3 according to the invention and explaining a configuration of the vibration type motor 4. FIG. 8A is an exploded view viewed from obliquely above and FIG. 8B is an exploded perspective view viewed from obliquely below. The vibration type motor 4 is constituted by a vibrator 41, a friction member 42, a holding member 43, fastening members 44, a vibrator holding member 45, a vibrator connecting member 46, fixing members 47 that fix the vibrator connecting member 46, a pressing member 48, a pressing plate 49 and rolling balls 50.

The vibrator 41, the friction member 42, the holding member 43 and the fastening members 44 have characteristics similar to those of the vibration type motor 2 of the second embodiment. The configuration is similar to the vibration type motor 2 so that detailed explanation thereof is omitted. Further, the above configuration provides operations and effects similar to those of the vibration type motor 2. Furthermore, in addition to the characteristics of the vibration type motor 2, grove portions 43a are formed on the holding member 43 to have the rolling balls 50 positioned therein.

The vibrator holding member 45 holds the vibrator 41 and is integrated with the vibrator 41 to drive the friction member 42. Further, it includes drive force transmitting portion 45a that transmits drive force of the vibrator 41 externally and groove portions 45b in which the rolling balls 50 are disposed.

The vibrator connecting portion 46 is formed from, for example, a metal plate having a thin plate shape. Because of the thin metal plate, it is readily deformed in a direction in which the vibrator 41 is pressed against the friction member 42 (D3 direction in FIGS. 8A and 8B) and is hardly deformed in a drive direction of the vibration type motor 4 (D1 direction in FIGS. 8A and 8B). The vibrator connecting member 46 includes coupling portions 46a to be coupled to the vibrator 41. The coupling portions 46a are coupled to the vibrator 41 by, for example, adhesion and welding. Further, the vibrator connecting member 46 is fixed to the vibrator holding member 45 with screws that are fixing members 47 for fixing the vibrator connecting member 46. The vibrator 41 and the vibrator holding member 45 are connected by the vibrator connecting member 46.

Here, the vibrator connecting member 46 is readily deformed in the direction in which the vibrator 41 is pressed against the friction member 42 so that the pressing force for pressing the vibrator 41 against the friction member 42 is not hindered. Further, it is hardly deformed in the drive direction of the vibration type motor 4 so that the vibrator 41 and the vibrator holding member 45 can be connected in the drive direction of the vibration type motor 4 without looseness.

The pressing member 48 is, for example, a compressed spring and is elastically deformed to generate the pressing force for pressing the vibrator 41 against the friction member 42.

The pressing plate 49 is disposed between the pressing member 48 and the vibrator 41. Felt as a buffer member 49a is adhered to the pressing plate 49. The pressing plate 49 is in contact with the vibrator 41 through the buffer member 49a so that the pressing force that the pressing member 48 generates can be transmitted to the vibrator 41 without hindering vibration of the vibrator 41.

The rolling balls 50 are disposed between the groove portions 43a of the holding member 43 and the groove portions 45b of the vibrator holding member 45. With this configuration, the vibrator 41, the vibrator holding member 45, the pressing member 48 and the pressing plate 49 are held to be movable in only the drive direction (D1 direction in FIGS. 8A and 8B) of the vibration type motor 4 with respect to the friction member 42 and the holding member 43.

With the above configuration, when the vibrator 41 is vibrated, the vibrator 41, the vibrator holding member 45, the pressing member 48 and the pressing plate 49 are moved by the friction force generated between the vibrator 41 and the friction member 42 in the D1 direction. It is noted that a configuration in which a position of the vibrator 41 is fixed and the friction member 42 is moved in the D1 direction by the friction force generated between the vibrator 41 and the friction member 42 may be employed to move the lens holder 32 and the lens 31 with movement of the friction member 42.

As illustrated in FIGS. 7A and 7B, the drive force transmitting portion 45a of the vibrator holding member 45 is connected with the groove portion 32b of the lens holder 32 that holds the lens 31 so that the lens 31 and the lens holder 32 can be advanced and retreated in the optical axis direction (D1 direction in FIGS. 7A and 7B) by drive of the vibration type motor 4. A characteristic of the lens drive apparatus 3 is to perform lens drive using the vibration type motor 4 having the characteristics similar to those of the vibration type motor 2 according the second embodiment of the invention.

Subsequently, operations of the lens drive apparatus 3 using the vibration type motor 4 according to the third embodiment of the invention will be described.

The vibration type motor 4 used for lens drive of the lens drive apparatus 3 has characteristics similar to the vibration type motor 2 according to the second embodiment and can obtain operations in which variations in resonance frequency of the friction member 42 is small similarly to the vibration type motor 2.

Further, effects of the lens drive apparatus 3 using the vibration type motor 4 according to the third embodiment of the invention will be described.

Changes in the resonance frequency of the friction member 42 are small in the lens drive apparatus 3. Accordingly, it is hardly affected by variations in dimension of components and in fixing method. Further, since the changes in resonance frequency of the friction member 42 are small, there can be provided a lens drive apparatus that hardly decreases drive force and generates noise.

It is noted that although an example for driving a focus lens is driven in the lens drive apparatus 3 is raised, a lens to be driven is not limited to the focus lens and the effects of the invention can be achieved even in cases of, for example, a zoom lens and a vibration-proof lens.

Namely, the lens drive apparatus 3 can be used for a lens unit (replacement lens) that is removably attached to image pickup apparatuses such as a digital camera or the like. Further, the lens drive apparatus 3 can be used for a lens barrel integratedly provided in image pickup apparatuses such as a digital camera or the like.

In the lens drive apparatus 3, it is exemplified that the vibration type motor 4 that has characteristics similar to those of the vibration type motor 2 according to the second embodiment is used to perform lens drive. However, the vibration type motor used for lens drive needs not to be the same as the vibration type motor 2 and the effects of the invention can be obtained if any of the vibration type motors described in each of the embodiments of the invention is used. Further, an ultrasonic motor in which, for example, a vibrator generates ultrasonic vibration may be used for the vibration type motor.

The invention may be applicable to lens drive and the like in a lens barrel of a camera that needs a compact and high output motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110460, filed May 29, 2015, which is hereby incorporated by reference herein in its entirety.

What is claimed is:

1. A vibration type motor comprising:
a vibrator that vibrates by application of an AC voltage;
a friction member that includes a first surface in pressed contact with the vibrator and a second surface positioned on a side opposed to the first surface, the friction member extending in a predetermined direction; and
a holding member that holds the friction member,
wherein the first surface forms with a surface adjacent thereto a first corner portion extending in a direction parallel with the predetermined direction,
wherein the second surface forms with a surface adjacent thereto a second corner portion extending in the direction parallel with the predetermined direction,
wherein the first corner portion is different in radius of curvature from the second corner portion, and
wherein either one of the first surface and the second surface is in contact with the holding member, the either one of the first surface and the second surface forms with the surface adjacent thereto one of the first corner portion and the second corner portion and the one of the first corner portion and the second corner portion has a radius of curvature smaller than the other.

2. A vibration type motor according to claim 1, wherein the holding member includes one or more fixing portions that fix the friction member and one or more contact surfaces in contact with the friction member in each of the one or more fixing portions, and the friction member includes a slide area on which the vibrator frictionally slides,
wherein in each of the one or more fixing portions, a direction in which the friction member extends viewed from the one or more fixing portions is defined as a first direction, and
wherein in each of the one or more fixing portions, a direction perpendicular to the first direction on the one or more contact surfaces is defined as a second direction, and a length in the second direction of the one or more contact surfaces which each of the one or more fixing portions includes is maximized at an end portion on a side where the slide area is present in the first direction.

3. A vibration type motor according to claim 2, further comprising a fastening member that fastens the friction member to the holding member,
wherein in each of the one or more fixing portions, a predetermined area of the fastening member is brought into pressed contact with the friction member to bring the friction member into contact with the one or more contact surfaces and the predetermined area of the fastening member is included in the one or more contact surfaces viewed from a direction perpendicular to the one or more contact surfaces.

4. A vibration type motor according to claim 1, wherein the first surface of the friction member is in contact with the holding member.

5. A vibration type motor according to claim 1, wherein the second surface of the friction member is in contact with the holding member.

6. A vibration type motor according to claim 1, wherein the vibration type motor is an ultrasonic motor in which the vibrator generates ultrasonic vibration.

7. A vibration type motor comprising:
a vibrator;
a first member that is in contact with the vibrator and changes a relative position to the vibrator by vibration of the vibrator; and
a second member that holds the first member,
wherein the first member includes a first surface in contact with she vibrator and a second surface positioned on a side opposed to the first surface, one of the first surface and the second surface is in contact with the holding member, the one of the first surface and the second surface forms with a surface adjacent thereto a corner portion having a smaller radius of curvature.

8. A vibration type motor according to claim 7,
wherein the second member includes a projecting portion in contact with the first member, and at least a portion of the projecting portion extends beyond an end portion of a contact surface that is in contact with the second member and that is one of the first surface and the second surface in a direction parallel with the contact surface.

9. A vibration type motor according to claim 7, wherein the contact surface is a surface where a burr is generated.

10. A vibration type motor according to claim 9, wherein the contact surface is a surface where the burr generated is taken out.

11. A vibration type motor according to claim 7, wherein the contact surface is a surface on a side opposed to a sagged surface.

12. A lens drive apparatus that drives a lens using the vibration type motor according to claim 1.

13. A lens unit removably attached to an image pickup apparatus, driving a lens drive apparatus using the vibration type motor according to claim 12.

14. An image pickup apparatus that drives a lens using the lens drive apparatus according to claim 12.

15. A lens drive apparatus that drives a lens using the vibration type motor according to claim 7.

16. A lens unit to be removably attached to an image pickup apparatus, driving a lens using the lens drive apparatus according to claim 15.

17. An image pickup apparatus that drives a lens using the lens drive apparatus according to claim 15.

\* \* \* \* \*